United States Patent [19]

Cortes-Garza

[11] 4,209,862

[45] Jul. 1, 1980

[54] BATHROOM FIXTURES AND PROCESS OF MANUFACTURE

[76] Inventor: Rodrigo Cortes-Garza, Avenue Madero 2473 Ote., Monterrey, Nuevo Leon, Mexico

[21] Appl. No.: 22,941

[22] Filed: Mar. 22, 1979

Related U.S. Application Data

[63] Continuation-in-part of Ser. No. 913,676, Jun. 8, 1978, abandoned.

[30] Foreign Application Priority Data

May 11, 1978 [MX] Mexico .................................. 173456

[51] Int. Cl.² .......................... E03C 1/18; B29D 27/04
[52] U.S. Cl. ...................................... 4/187 R; 4/651; 264/46.5; 264/46.9; 428/15; 428/304; 428/315

[58] Field of Search ................... 264/46.6, 46.5, 46.9; 4/187 R, 166; 428/15, 304, 315

[56] References Cited

U.S. PATENT DOCUMENTS

| | | | |
|---|---|---|---|
| 3,433,860 | 3/1969 | Ruggles et al. | 4/187 R X |
| 3,673,617 | 7/1972 | Schulz | 264/46.6 X |
| 3,826,629 | 7/1974 | Pryor et al. | 4/187 R X |

*Primary Examiner*—Philip Anderson
*Attorney, Agent, or Firm*—Bard & Groves

[57] ABSTRACT

A method and apparatus for manufacturing reinforced composite marble-like sinks and bathtubs. A sandwiched article is provided and wherein a polyurethane foam filler is interposed between a solid marble mix layer and a reinforcing layer of fiberglass reinforced resin embedded in the marble mix layer. The foam layer reduces the overall weight of such lavatory structures.

9 Claims, 8 Drawing Figures

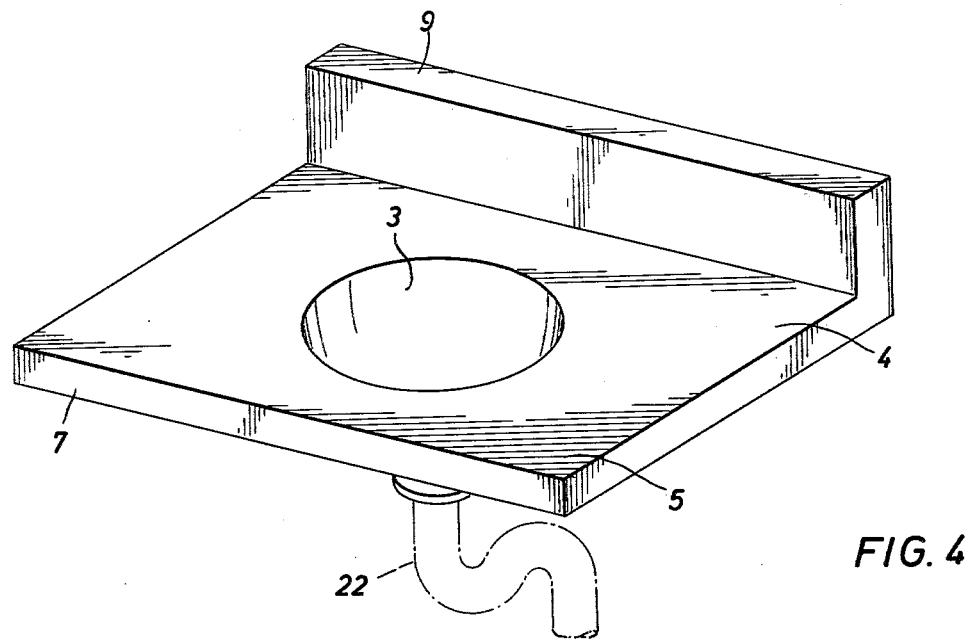
FIG. 4
FIG. 5
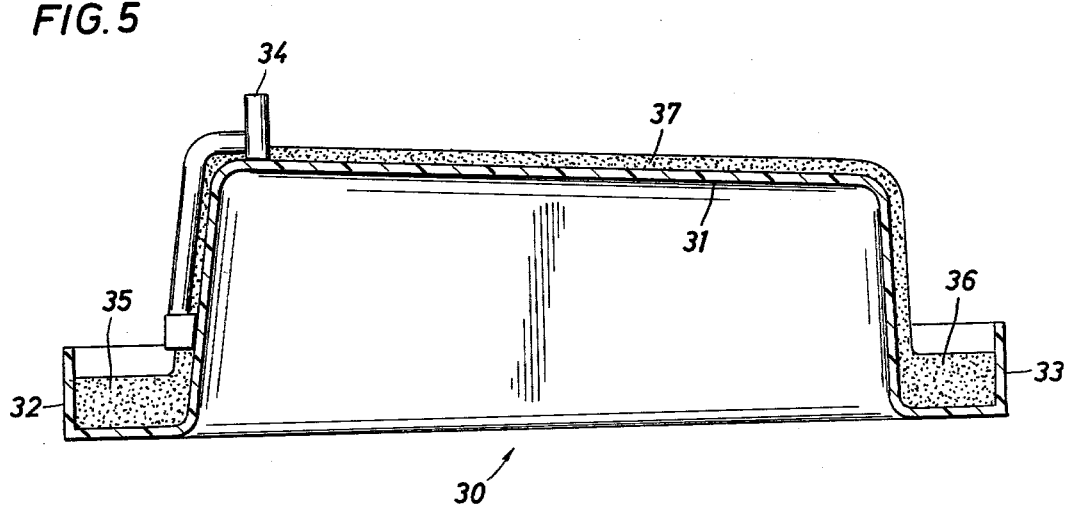
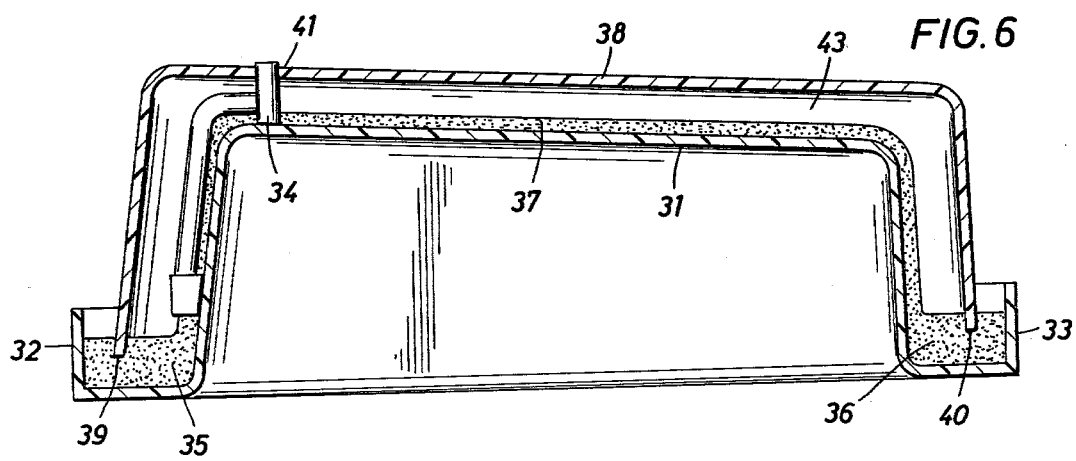
FIG. 6

U.S. Patent  Jul. 1, 1980  Sheet 3 of 3  4,209,862
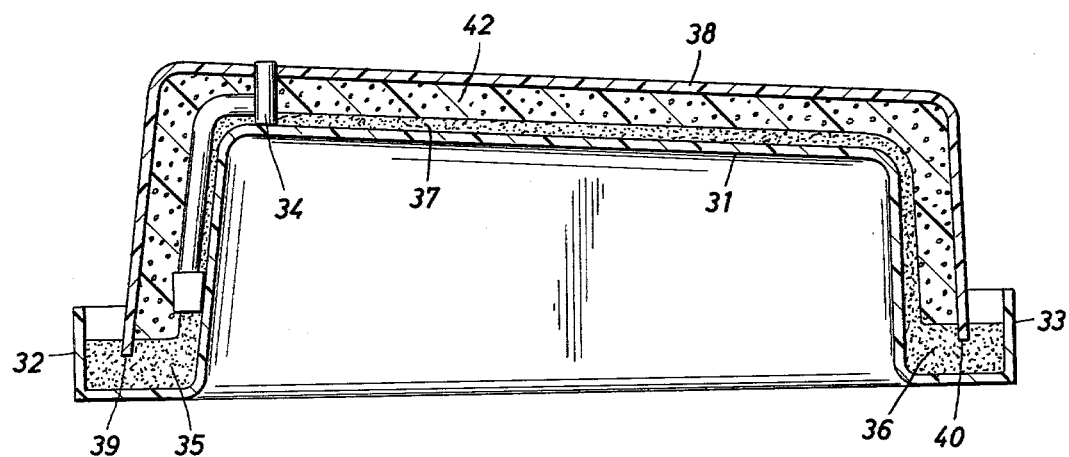
FIG. 7
FIG. 8
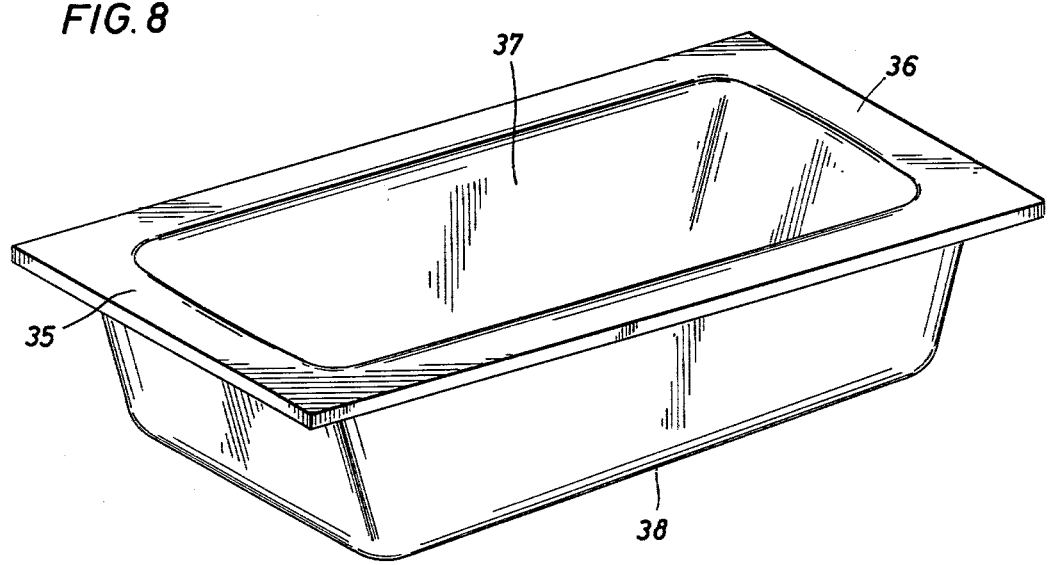

BATHROOM FIXTURES AND PROCESS OF MANUFACTURE

RELATED CASES

This application is a continuation-in-part of my prior copending application Ser. No. 913,676, filed June 8, 1978, and which is now abandoned.

BACKGROUND OF THE INVENTION

This invention relates to bathroom fixtures and to methods of manufacture of such fixtures. More particularly, the invention relates to new and novel reinforced composite simulated marble sinks and vanity tops and bathtubs, and to new and improved methods of manufacture of such reinforced structures.

It is well known to manufacture sinks, vanity tops, bathtubs, showerstalls, and kitchen counter tops of marble. Such lavatory items and household structures of marble construction provide the advantages of beauty, ease of maintenance, and color coordination, yet result in structures that because of their solid marble construction are extremely heavy with the result that they are more than cumbersome from the standpoint of shipping, handling, and installation. Such prior solid marble items have also conventionally been manufactured by what are known in the art as multi-pour techniques and such techniques are both primitive, time consuming and burdensome.

For example, there is depicted and described in U.S. Pat. No. 3,433,860, a method for manufacturing a sink and vanity top combination of solid simulated marble wherein a first pour of a simulated marble mix is applied over a male mold, followed by a second pour of a simulated marble mix over the first pour and intermediate a female mold. While such method is effective to produce aesthetically pleasing items of manufacture yet the finished product is excessive in weight due to its solid marble-like construction and the process for its manufacture is time consuming as a result of the set and cure times required for the multi-layered marble-like structure.

These disadvantages of the prior art are overcome with the present invention and wherein there is provided a method of manufacturing marble-like lavatory items requiring less set and cure time and therefore of increased commercial acceptability. More particularly, however, not only is the time of manufacture of such items decreased, but the overall weight of such items is minimized due to the unique composite construction of such items as set forth herein in greater detail.

SUMMARY OF THE INVENTION

This invention is for an improved process for manufacturing sinks and bathtubs having a simulated marble exterior with the result that the time of manufacture is greatly reduced and wherein the weight of such items is substantially minimized to the extent of at least 40% and 70% in the case of sinks and bathtubs respectively. More particularly, the time of manufacture for such simulated marble sinks and bathtubs is reduced substantially one-half over that previously required. As used herein, the term "marble" means a simulated or marble-like material.

In accordance with the present invention, a composite reinforced marble lavatory item is provided and which includes a first useable surface layer of marble mix. A fiberglass reinforcing layer is then embedded in the marble mix surface layer leaving a space therein which is filled with a polyurethane foam. The foam layer functions in place of the prior art second pours of marble, and the fiberglass protects the foam layer from damage while permitting the foam layer to function as a filler.

In its broadest concept, a male mold or bonnet is provided and including a drain and overflow assembly which forms an integral part of the finished article. A marble mix is then poured over the male mold and before the mix is allowed to set, a fiberglass reinforcing member is embedded into the mix at its periphery but with the central portion of the fiberglass layer spaced above the mix. Polyurethane foam is then injected into the space between the fiberglass layer and the marble mix, and the structure is allowed to set. The male mold is then removed and a composite marble, foam, fiberglass reinforced resin structure is produced.

Any type of reinforcing layer may be embedded in the marble mix, and while fiberglass reinforced resin is the preferred material of this layer, there may also be provided reinforcing layers of readily moldable materials such as polyethylene or polystyrene. It is the primary function of the fiberglass reinforcing layer to protect the filler layer of polyurethane since while the foam layer reduces the overall weight of the finished product, it is nevertheless not resistant to abrasion, cracking, chipping or puncture.

Regardless of the exact nature of the reinforcing layer, it is essential that the material of this layer be rigid enough to be embedded into the marble mix in order to provide a permanent attachment thereto and to define a void for the foam. The foam is preferably polyurethane and is made by reacting a polyol with isocyanate in the presence of a blowing agent such as Freon or water together with the necessary catalyst and surfactant. The marble mix may be any one of the conventional marble mixes, solid color mixes, or aggregate mixes, known in the art. The fiberglass reinforcing layer may comprise a premolded fiberglass reinforced epoxy resin layer, or the reinforcing layer may be applied by hand using epoxy resin and chopped fiberglass. In any event, the particular materials used in the herein described process are conventional in the art, and with specific regard to the marble mix, reference may be had to the aforementioned U.S. Pat. No. 3,433,860.

It is a feature of the present invention to manufacture sinks and bathtubs of marble and which include polyurethane foam as a filler layer in order to reduce the weight of such sinks and bathtubs 40% and 70%, respectively.

It is also a feature of the present invention to diminish the cost of manufacture of marble sinks and bathtubs by employing a filler of polyurethane foam.

It is a further feature of the present invention to provide a composite marble and polyurethane foam sink or bathtub and with the foam reinforced by a fiberglass reinforced resin layer overlying the foam and permanently embedded in the marble mix.

These and other features and advantages of the present invention will become apparent from the following description, wherein reference is made to the figures in the accompanying drawings.

DRAWINGS

FIG. 4 is a view of the sink produced in accordance with FIGS. 1-3.

FIG. 5 shows a simplified pictorial representation of the first step in the process for molding a composite reinforced marble bathtub.

FIG. 6 is a view similar to FIG. 5 and including the second or reinforcing step in the manufacture of a bathtub in accordance with the present invention.

FIG. 7 is a further view similar to FIG. 6 and illustrating the final foam filling operation in the production of a bathtub.

FIG. 8 is a view of the bathtub produced in accordance with FIGS. 5-7.

DETAILED DESCRIPTION

Figure 1:
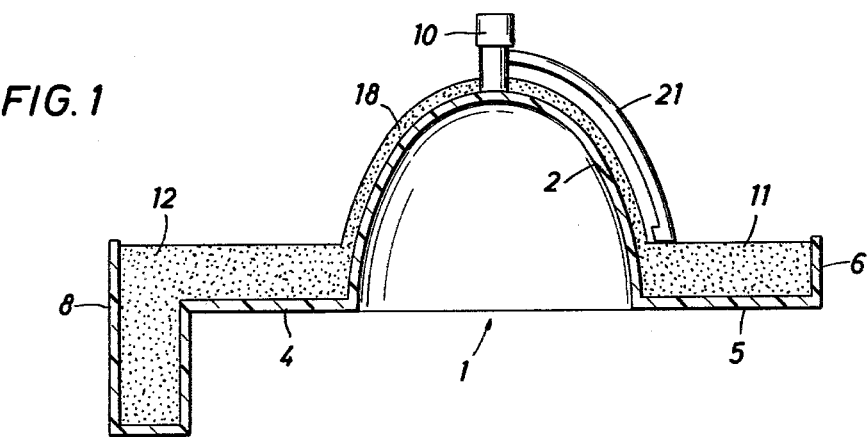
FIG. 1 shows a simplified pictorial representation of the first step in the process for molding a composite reinforced marble sink.

Referring now to FIG. 1, there will be seen a pictorial representation of apparatus in the first phase of production of the sink and vanity top of the finished product seen in FIG. 4.

In FIG. 1, a male mold member 1 is provided and which includes a dome portion 2 which corresponds to the bowl portion 3 of FIG. 4. The mold 1 further includes flat surfaces 4 and 5 which form the vanity top as seen in FIG. 4. An upstanding flange 6 adjoins surface 5 of mold 1 and determines the thickness of the vanity top 7 depicted in FIG. 4. A channel section 8 is connected to mold surface 4 and forms the backwall 9 of the vanity portion of the sink as is seen in FIG. 4. In order to provide a drain and overflow connection for the sink of FIG. 4, there is seen atop dome portion 2 in FIG. 1, an assembly 10 which is to constitute a permanent assembly in the finished product. Thus, drain and overflow assembly 10 will be removed integrally with the finished sink as will be seen hereinafter.

With the components arranged as in FIG. 1, a marble mix is prepared. A suitable mix may be formed as follows:

Polyester resin—25%
Catalyst—0.5-1.0%
Calcium Carbonate (Crushed marble)—75%

Other suitable mixtures might be formed in accordance with the teaching of U.S. Pat. No. 3,433,860, although any conventional marble mixes could be employed herein. The mix is poured into areas 11 and 12 of the mold 1 of FIG. 1, and a portion of the mix is allowed to flow over the dome surface portion 2 of the mold. Obviously, the contour of dome portion 2 allows only a limited amount of mix to adhere to the sloping surface. The mold 1 can then be vibrated to insure that the marble mix fully fills areas 11 and 12, and additional mix can be added to areas 11 and 12 and to dome 2 thereafter if there is recession of the levels due to vibration.

Figure 2:
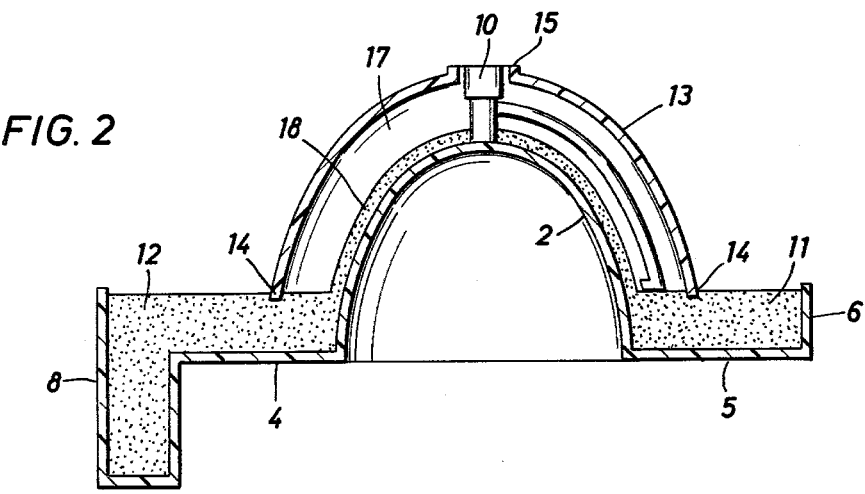
FIG. 2 is a view similar to FIG. 1 and including the second or reinforcing step in the manufacture of a sink in accordance with the present invention.

Immediately after the areas 11 and 12 are filled and vibrated and before the mix is allowed to gel, a preformed fiberglass reinforced epoxy resin layer 13 is inserted over the dome 2 and with the periphery 14 of the layer 13 embedded in the marble mix of areas 11 and 12. This step is illustrated more particularly in FIG. 2. In FIG. 2, it will be seen that reinforcing layer 13 includes a central opening 15 which accommodates the immediate portion of drain assembly 10. Layer 13 remains in the position as seen in FIG. 2 for a time sufficient for the marble mix in areas 11 and 12 to gel and firmly set, usually 30 minutes, and with the result that the peripheral area 14 of layer 13 becomes firmly embedded in the mix in areas 11 and 12.

Figure 3:
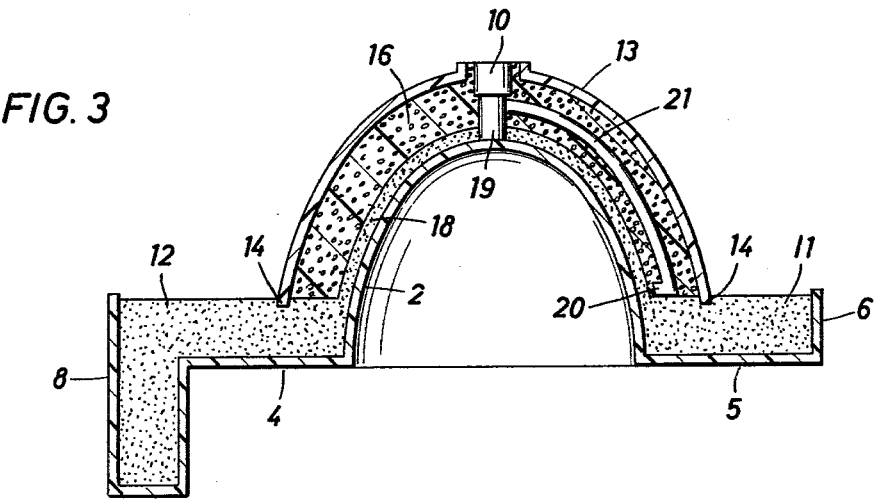
FIG. 3 is a further view similar to FIG. 2 and illustrating the final foam filling operation in the production of a sink.

As seen in FIG. 3, polyurethane foam 16 is then injected through opening 15 and space 17 between layer 13 and dome 2 including assembly 10 is filled with the foam. Foam 16 will set and harden in about 60 seconds and mold 1 can thereafter be removed. Removal of the mold 1 can be facilitated by coating its surfaces with release agents prior to use, of course. Examination of the finished product reveals that foam layer 16 is merged with marble mix layers 11 and 12 and with the thin marble mix layer 18 of the dome, and that the reinforcing fiberglass layer 13 is embedded in marble mix areas 11 and 12 and covers the foam layer 16. The product from FIG. 3 is thereupon finished off by further heat curing, if desired. Excess material may then be machined or ground off, and the drain section 19 drilled out. An overflow inlet 20 may then be bored to communicate bowl 3 with the overflow extension 21 of assembly 10. Conventional plumbing fixtures 22 can be attached to complete the unit.

Referring now to FIGS. 5-7, there is depicted a stepwise process for the production of a bathtub as seen in FIG. 8. Since the process for the production of the tub of FIG. 8 is substantially identical to the steps of FIGS. 1-3 for producing the sink of FIG. 4, only a brief description is deemed necessary for the alternate embodiment of FIGS. 5-8. In any event, and with reference to FIG. 5, mold 30 is provided and including dome portion 31 forming the area of the tub to be occupied. The rim of the tub is formed by flange sections 32 and 33. Drain and overflow assembly 34 is arranged on dome portion 31, and the marble mix is poured over dome portion 31 and into areas 35 and 36 of flange portions 32 and 33 respectively. A thin layer 37 of the mix is also formed on the dome surface portion 31.

Before the mix sets or gels, and as seen in FIG. 6, the preformed fiberglass reinforced epoxy resin sheet is placed over dome portion 31 and with the end portions 39 and 40 embedded in the marble mix of areas 35 and 36 respectively. Opening 41 of sheet 38 accommodates connector 34, and after the marble mix has set embedding sheet ends 39 and 40 therein, polyurethane foam 42 is injected to fill void 43. After the foam has set and hardened, mold 30 is removed and the tub of FIG. 8 is provided which may be otherwise finished off as previously described.

In producing either the sink of FIG. 4, or the tub of FIG. 8, it should be noted that after the initial pour of the marble mix, there is not allowed to elapse more than about ten minutes before inserting the fiberglass reinforced resin layer into the mix. Thereafter, about 30 minutes is allowed for the mix to harden, whereupon the foam is injected and set in about one minute. Accordingly, the articles of this invention may be manufactured in about 45 minutes to about one and one-half hours, which is substantially two to three times faster than processes of the prior art. The presence of the foam filler also reduces the weight of the sinks and tubs of the present invention to approximately 40% to 70% respectively of those items of the prior art.

While the present invention has been described in particular with regard to sinks and bathtubs, it should be obvious that the concepts set forth herein are equally applicable to other such items as showerstalls, wall panels, kitchen counter tops and toilets.

While the foam filler layer has been preferably constructed of polyurethane as hereinbefore set forth, other and equivalent conventional foams could be substituted therefor without departing from the concepts of the invention set forth therein. For example, it is also contemplated to use herein foams of polystyrene, phenolics, expandable vinyl, low density and crosslinked polyethylene, ethylene copolymers, ionomer, syntactic polybenzimidazole, silicones, and cellular cellulose acetate.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

I claim:

1. A composite stock material comprising a first layer of marble, a second layer of polyurethane foam, and a third reinforcing layer of fiberglass reinforced resin having a portion thereof embedded in said marble and a portion overlying and in contact with said foam.

2. A bathroom fixture and the like for holding liquid and comprising:
    a basin portion formed of marble,
    a reinforcing layer of fiberglass reinforced resin having a portion embedded in said marble and a portion spaced from said marble, and
    a filler layer of polyurethane foam sandwiched between the marble and the portion of the reinforcing layer spaced therefrom.

3. A bathroom fixture and the like for holding liquid and comprising:
    a basin portion formed of marble,
    a reinforcing layer of rigid material having a portion embedded in said marble and a portion spaced from said marble, and
    a filler layer of foam sandwiched between the marble and the portion of the rigid reinforcing layer spaced therefrom.

4. The fixture of claim 3 wherein said rigid material is fiberglass reinforced resin material and said foam is polyurethane foam.

5. The fixture of claim 3 wherein said foam is polyurethane foam and said rigid material is selected from the group consisting of fiberglass reinforced resin, polyethylene, and polystyrene.

6. A method of manufacturing a bathroom fixture and the like comprising:
    forming over a male mold a basin of a thin layer of a marble mix having thick peripheral areas of the marble mix,
    embedding prior to curing the mix a rigid reinforcing sheet in the thick areas of the mix with a portion of the sheet spaced from the thin marble mix layer, and
    injecting foam resin material into the space between the sheet and mix and permitting it to set.

7. The method of claim 6 wherein said rigid sheet is fiberglass reinforced resin material and said foam is polyurethane foam.

8. The method of claim 6 wherein said foam is polyurethane foam and said rigid sheet is a material selected from the group consisting of fiberglass reinforced resin, polyethylene, and polystyrene.

9. A method of manufacturing a bathroom fixture and the like comprising:
    forming over a male mold a basin of a thin layer of a marble mix having thick peripheral areas of the marble mix,
    embedding prior to curing the mix a fiberglass reinforcing sheet in the thick areas of the mix with a portion of the sheet spaced from the thin marble mix layer, and
    injecting a formable urethane resin reaction mixture into the space between the sheet and the mix and foaming and curing said mixture.

* * * * *